(12) United States Patent
Veerasamy

(10) Patent No.: US 6,395,333 B2
(45) Date of Patent: May 28, 2002

(54) METHOD OF MAKING HYDROPHOBIC COATED ARTICLE

(75) Inventor: Vijayen S. Veerasamy, Farmington Hills, MI (US)

(73) Assignee: Guardian Industries Corp., Auburn Hills, MI (US)

( * ) Notice: Subject to any disclaimer, the term of this patent is extended or adjusted under 35 U.S.C. 154(b) by 0 days.

(21) Appl. No.: 09/927,507

(22) Filed: Aug. 13, 2001

Related U.S. Application Data

(60) Division of application No. 09/442,805, filed on Nov. 18, 1999, now Pat. No. 6,338,901, which is a continuation-in-part of application No. 09/303,548, filed on May 3, 1999, now Pat. No. 6,261,693.

(51) Int. Cl.[7] .............................................. C23C 16/26
(52) U.S. Cl. ..................... 427/249.7; 427/533; 427/535
(58) Field of Search ........................... 427/249.1, 249.7, 427/530, 577, 535, 533

(56) References Cited

U.S. PATENT DOCUMENTS

| | | |
|---|---|---|
| 4,060,660 A | 11/1977 | Carlson et al. |
| 4,210,431 A | 7/1980 | Bachman et al. |
| 4,263,350 A | 4/1981 | Valimont |
| 4,495,263 A | 1/1985 | Vandervalk |
| RE32,272 E | 10/1986 | Funaki et al. |
| 4,666,802 A | 5/1987 | Hung et al. |
| 4,816,291 A | 3/1989 | Desphandey et al. |
| 4,935,303 A | 6/1990 | Ikoma et al. |
| 4,965,156 A | 10/1990 | Hotomi et al. |
| 5,000,831 A | 3/1991 | Osawa et al. |
| 5,098,737 A | 3/1992 | Collins et al. |
| 5,122,249 A | 6/1992 | Niemann et al. |
| 5,135,808 A | 8/1992 | Kimock et al. |
| 5,143,963 A | 9/1992 | Sterling et al. |
| 5,190,807 A | 3/1993 | Kimock et al. |

(List continued on next page.)

FOREIGN PATENT DOCUMENTS

| | | |
|---|---|---|
| EP | 0 499 287 A1 | 8/1992 |
| WO | WO 04/12680 | 6/1994 |
| WO | 9412680 A * | 6/1994 |
| WO | 9745834 A * | 12/1997 |
| WO | WO 98/45847 | 10/1998 |

OTHER PUBLICATIONS

"6001 Chemical Abstracts", Columbus, Ohio (1996) 1 pg.

"Highly Tetrahedral, Diamond–Like Amorphous Hydrogenated Carbon Prepared from a Plasma Beam Source", Sattel et al., Published Feb. 1994 pp. 2797–2799.

"Deposition of Carbon Films by a Filtered Cathodic Arc", Kuhn et al., Jan. 1993, pp. 1350–1354.

"Electronic Density of States in Highly Tetrahedral Amorphous Carbon", Veerasamy et al., Aug. 1993, pp. 319–326.

"Preparation and Properties of Highly Tetrahedral Hydrogenated Amorphous Carbon", Weiler et al., Jan. 1996, pp. 1594–1607.

"Optial and Electrical Properties of Amorphous Diamond", Veerasamy et al., Feb. 1993, p. 782–787.

"IBM Tech. Bulletin", vol. 36, No. 3 (1993) 1 pg.

"IBM Tech. Bulletin", vol. 36, No. 1 (1993) 1 pg.

"Tetrahedral Amorphous Carbon Deposition, Characterisation and Electronic Properties" by Veerasamy, Univ. of Cambridge, Dept. of Engineering, Jul. 1994.

"ANSI Z26.1", Society of Automotive Engineers, American National Standards Institute, Inc., 1977.

*Primary Examiner*—Bret Chen
(74) *Attorney, Agent, or Firm*—Nixon & Vanderhye P.C.

(57) ABSTRACT

A method of making a coated article, the method including depositng a diamond-like carbon (DLC) layer or coating on a substrate. In certain example embodiments, the coating has a high contact angle.

8 Claims, 11 Drawing Sheets

U.S. PATENT DOCUMENTS

| | | |
|---|---|---|
| 5,268,217 A | 12/1993 | Kimock et al. |
| 5,352,493 A | 10/1994 | Dorfman et al. |
| 5,378,527 A | 1/1995 | Nakanishi et al. |
| 5,401,316 A | 3/1995 | Shiraishi et al. |
| 5,415,927 A | 5/1995 | Hirayama et al. |
| 5,425,983 A | 6/1995 | Propst et al. |
| 5,437,894 A | 8/1995 | Ogawa et al. |
| 5,455,081 A | 10/1995 | Okada et al. |
| 5,470,661 A | 11/1995 | Bailey et al. |
| 5,474,816 A | 12/1995 | Falabella |
| 5,506,038 A | 4/1996 | Knapp et al. |
| 5,508,092 A | 4/1996 | Kimock et al. |
| 5,508,368 A | 4/1996 | Knapp et al. |
| 5,510,186 A | 4/1996 | Sulzbach |
| 5,518,780 A | 5/1996 | Tamor et al. |
| 5,527,596 A | 6/1996 | Kimock et al. |
| 5,580,605 A | 12/1996 | Ogawa et al. |
| 5,614,574 A | 3/1997 | Sheth |
| 5,616,179 A | 4/1997 | Baldwin et al. |
| 5,624,718 A | 4/1997 | Dearnaley |
| 5,635,258 A | 6/1997 | Chen et al. |
| 5,643,423 A | 7/1997 | Kimock et al. |
| 5,653,812 A | 8/1997 | Petrmichl et al. |
| 5,665,424 A | 9/1997 | Sherman |
| 5,679,269 A | 10/1997 | Cohen et al. |
| 5,718,976 A | 2/1998 | Dorfman et al. |
| 5,731,046 A | 3/1998 | Mistry et al. |
| 5,776,603 A | 7/1998 | Zagdoun et al. |
| 5,795,648 A | 8/1998 | Goel et al. |
| 5,800,918 A | 9/1998 | Chartier et al. |
| 5,844,225 A | 12/1998 | Kimock et al. |
| 5,846,613 A | 12/1998 | Neuville |
| 5,846,649 A | 12/1998 | Knapp et al. |
| 5,858,477 A * | 1/1999 | Veerasamy et al. ......... 427/562 |
| 5,876,753 A | 3/1999 | Timmons et al. |
| 5,879,775 A | 3/1999 | Walter et al. |
| 5,888,593 A | 3/1999 | Petrmichl et al. |
| 5,900,342 A | 5/1999 | Visser et al. |
| 5,939,149 A | 8/1999 | Jang et al. |
| 5,958,601 A | 9/1999 | Salsman |
| 5,958,996 A | 9/1999 | Egitto et al. |
| 5,965,216 A | 10/1999 | Neuberger et al. |
| 5,965,629 A | 10/1999 | Jung et al. |
| 5,989,693 A | 11/1999 | Yamasaki et al. |
| 5,997,943 A | 12/1999 | Azzopardi et al. |
| 6,001,431 A | 12/1999 | Itoh et al. |
| 6,002,208 A | 12/1999 | Maishev et al. |
| 6,046,758 A | 4/2000 | Brown et al. |
| 6,236,543 B1 * | 5/2001 | Han et al. ................ 360/236.6 |
| 6,261,693 B1 | 7/2001 | Veerasamy |

\* cited by examiner

METHOD OF MAKING HYDROPHOBIC COATED ARTICLE

This application is a division of application Ser. No. 09/442,805, filed Nov. 18, 1999, U.S. Pat. No. 6,338,901, which is a CIP of Ser. No. 09/303,548, filed May 3, 1999 (U.S. Pat. No. 6,261,693 ), the entire content of which is hereby incorporated by reference in this application.

This invention relates to a hydrophobic coating including diamond-like carbon (DLC) provided on (directly or indirectly) a substrate of glass, plastic, or the like, and a method of making the same. The coating may be deposited on the substrate utilizing plasma ion beam deposition in certain embodiments.

BACKGROUND OF THE INVENTION

Conventional soda inclusive glasses are susceptible to environmental corrosion which occurs when sodium (Na) diffuses from or leaves the glass interior, as well as to retaining water on their surfaces in many different environments, including when used as automotive windows (e.g. backlites, side windows, and/or windshields). When water is retained or collects on automotive windows, the water may freeze (i.e. forming ice) in certain environments. Additionally, the more water retained on a windshield, the higher power wiper motor(s) and/or wiper blade(s) required.

In view of the above, it is apparent that there exists a need in the art for (i) a coated article (e.g. coated glass or plastic substrate) that can repel water and/or dirt, and a method of making the same, (ii) a coated soda inclusive glass where the coating(s) reduces the likelihood of visible stains/corrosion forming; and/or (iii) a protective hydrophobic coating for window, glass, or plastic substrates that is somewhat resistant to scratching, damage, or the like.

It is known to provide diamond like carbon (DLC) coatings on glass. U.S. Pat. No. 5,637,353, for example, states that DLC may be applied on glass. Unfortunately, the DLC of the '353 patent would not be an efficient hydrophobic coating and/or would not be an efficient corrosion minimizer on glass in many instances.

U.S. Pat. No. 5,900,342 to Visser et al. discloses a fluorinated DLC layer on an electrophotographic element. From about 25–65% fluorine content by atomic percentage is provided at an outermost surface, to provide for low surface energy in an attempt to make removal of xerographic toner easier. Unfortunately, this DLC inclusive layer of the '342 patent would be too soft for use on a glass substrate in automotive applications and the like. Its apparent lack of $SP^3$ C—C bonds and/or lack of Si—O bonds contribute to its softness. It is also believed that continuous exposure to sun, rain, humidity, dust, windshield wipers, and/or the environment in general would cause the '342 DLC layer to break down or degrade rather quickly over time.

Thus, there also exists a need in the art for a DLC inclusive layer that has sufficient hardness and durability to withstand the environment while still exhibiting satisfactory hydrophobic qualities.

It is a purpose of different embodiments of this invention to fulfill any or all of the above described needs in the art, and/or other needs which will become apparent to the skilled artisan once given the following disclosure.

SUMMARY OF THE INVENTION

An object of this invention is to provide a durable coated article that can shed or repel water (e.g. automotive windshield, automotive backlite, automotive side window, architectural window, etc.).

Another object of this invention is to provide a coated substrate, wherein a coating includes $sp^3$ carbon—carbon bonds and has a wettability W with regard to water of less than or equal to about 23 mN/m, more preferably less than or equal to about 21 mN/m, and most preferably less than or equal to about 20 mN/m, and in most preferred embodiments less than or equal to about 19 mN/meter. This can also be explained or measured in Joules per unit area ($mJ/m^2$)

Another object of this invention is to provide a coated substrate, wherein a coating includes $sp^3$ carbon—carbon bonds and has a surface energy $Y_C$ of less than or equal to about 20.2 mN/m, more preferably less than or equal to about 19.5 mN/m, and most preferably less than or equal to about 18 mN/m.

Another object of this invention is to provide a coated substrate, wherein a DLC inclusive coating has an initial (i.e. prior to being exposed to environmental tests, rubbing tests, acid tests, UV tests, or the like) water contact angle θ of at least about 100 degrees, more preferably of at least about 110 degrees, even more preferably of at least about 115 degrees, and most preferably of at least about 125 degrees.

Another object of this invention is to provide a coating for a substrate, wherein at least about 15% (more preferably at least about 25%, and most preferably at least about 30%) of the bonds in the coating are $sp^3$ carbon—carbon (C—C) bonds; and wherein the coating includes by atomic percentage at least about 5% silicon (Si) atoms (more preferably at least about 15%, and most preferably at least about 20% Si), at least about 5% oxygen (O) atoms (more preferably at least about 15% and most preferably at least about 20%), at least about 5% hydrogen (H) atoms (more preferably at least about 10% and most preferably at least about 15%) taking into consideration either the coating's entire thickness or only a thin layer portion thereof. In certain embodiments, an increased percentage of H atoms may be provided near the coating's outermost surface. In certain embodiments, the coating has approximately the same amount of C and Si atoms.

Another object of this invention is to provide a coating for a glass substrate, wherein the coating includes a greater number of $Sp^3$ carbon—carbon (C—C) bonds than $sp^2$ carbon—carbon (C—C) bonds. In certain of these embodiments, the coating need not include any $sp^2$ carbon—carbon (C—C) bonds.

Another object of this invention is to provide a coated glass article wherein a DLC coating protects the glass from acids such as HF, nitric, and sodium hydroxide (the coating may be substantially chemically inert).

Another object of this invention is to provide a coated glass article that is abrasion resistant.

Another object of this invention is to provide a DLC coating on a substrate, wherein the coating includes different portions or layers with different densities and different $sp^3$ carbon—carbon bond percentages. The ratio of $sp^3$ to $sp^2$ carbon—carbon bonds may be different in different layers or portions of the coating. Such a coating with varying compositions therein may be continuously formed by varying the ion energy used in the deposition process so that stresses in the coating are reduced in the interfacial portion/layer of the DLC coating immediately adjacent the underlying substrate. Thus, a DLC coating may have therein an interfacial layer with a given density and $Sp^3$ carbon—carbon bond percentage, and another layer portion proximate a midsection of the coating having a higher density of $sp^3$ carbon—carbon (C—C) bonds. The outermost layer portion at the surface of the coating may be doped (e.g. addition of Si, O and/or F) so that this surface portion of the coating is less dense which increases contact angle and decreases the dispersive component of surface energy so as to improve hydrophobic characteristics of the coating.

Another object of this invention is to manufacture a coating having hydrophobic qualities wherein the temperature of an underlying glass substrate may be less than about 200° C., preferably less than about 150° C., most preferably less than about 80° C., during the deposition of a DLC inclusive coating. This reduces graphitization during the deposition process, as well as reduces detempering and/or damage to low-E coatings already on the substrate in certain embodiments.

Generally speaking, this invention fulfills any or all of the above described needs or objects by providing a coated article comprising:

a substrate (e.g. glass or plastic);
a coating including diamond-like carbon (DLC) provided on said substrate, said coating including $sp^3$ carbon—carbon bonds; and
wherein said coating has an initial contact angle $\theta$ with a drop of water of at least about 100 degrees, and an average hardness of at least about 10 GPa.

This invention further fulfills any or all of the above described needs and/or objects by providing a coated glass article comprising:

a glass substrate; and
a coating including diamond-like carbon (DLC) provided on said glass substrate, wherein the outermost 5 Å of said coating includes in atomic percentage at least about 50% H.

This invention further fulfills any or all of the above described needs and/or objects by providing a coated glass article comprising:

a glass substrate comprising, on a weight basis:
$SiO_2$ from about 60–80%,
$Na_2O$ from about 10–20%,
CaO from about 0–16%,
$K_2O$ from about 0–10%,
MgO from about 0–10%,
$Al_2O_3$ from about 0–5%;
a hydrophobic coating including diamond-like carbon (DLC) and $sp^3$ carbon—carbon bonds provided on said glass substrate; and
wherein said hydrophobic coating has an initial contact angle $\theta$ with a sessile drop of water of at least about 100 degrees, and an average hardness of at least about 10 GPa.

This invention further fulfills any or all of the above described needs and/or objects by providing a method of making a coated article, the method comprising the steps of:

providing a substrate; and
depositing a highly tetrahedral amorphous carbon (ta—C) inclusive coating having more $sp^3$ carbon—carbon bonds than sp2 carbon—carbon bonds on the substrate in a manner such that the ta—C inclusive coating has an initial contact angle $\theta$ of at least about 100 degrees.

In certain embodiments, the method includes plasma treating an outmost surface of the coating in order to provide at least H atoms in the coating proximate the outermost surface thereof so as to reduce surface energy of the coating.

This invention will now be described with respect to certain embodiments thereof, along with reference to the accompanying illustrations.

IN THE DRAWINGS

DETAILED DESCRIPTION OF CERTAIN EMBODIMENTS OF THIS INVENTION

Figure 1:
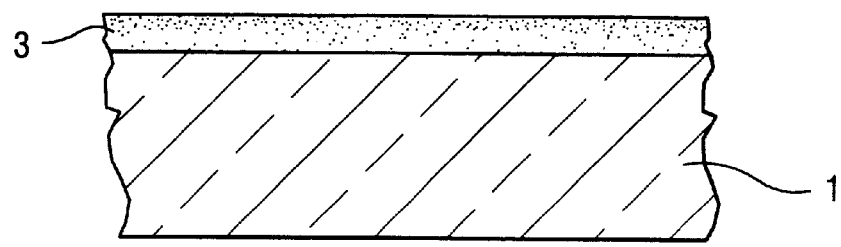
FIG. 1 is a side cross sectional view of a coated article according to an embodiment of this invention, wherein a glass or plastic substrate is provided with a DLC inclusive coating thereon having hydrophobic qualities.

Referring now more particularly to the accompanying drawings in which like reference numerals indicate like elements throughout the accompanying views.

FIG. 1 is a side cross sectional view of a coated article according to an embodiment of this invention, wherein at least one diamond-like carbon (DLC) inclusive protective coating(s) 3 is provided directly on substrate 1. Substrate 1 may be of glass, plastic, or the like. DLC inclusive coating 3 in the FIG. 1 embodiment includes at least one layer including highly tetrahedral amorphous carbon (ta—C). Coating 3 functions in a hydrophobic manner (i.e. it is characterized by high water contact angles θ and/or low surface energies as described below). In certain embodiments, coating 3 may be from about 50–1,000 Å thick, more preferably from about 100–500 Å thick, and most preferably from about 150–200 Å thick.

In certain embodiments, hydrophobic coating 3 may have an approximately uniform distribution of $sp^3$ carbon—carbon bonds throughout a large portion of its thickness, so that much of the coating has approximately the same density. In other more preferred embodiments, hydrophobic coating 3 may include a lesser percentage of $sp^3$ carbon—carbon bonds near the interface with substrate 1, with the percentage or ratio of $sp^3$ carbon—carbon bonds increasing throughout the thickness of the coating toward the outermost surface. Thus, coating 3 may include at least one interfacing layer directly adjacent substrate 1, this interfacing layer having a lesser density and a lesser percentage of $sp^3$ carbon—carbon bonds than the middle portion of DLC inclusive coating 3. In general, the network of $sp^3$ carbon—carbon bonds functions to hold the other atoms (e.g. Si, O, F, and/or H atoms) around it in the coating. In certain embodiments, it is desired to keep number of $sp^2$ carbon—carbon bonds throughout the entire thickness of the coating to no greater than about 25%, more preferably no greater than about 10%, and most preferably from about 0–5%, as these type bonds are hydrophillic in nature and attract water and the like. Thus, in preferred embodiments, at least about 50% (more preferably at least about 75%, and most preferably at least about 90%) or the carbon—carbon bonds in coating 3 are of the $sp^3$ carbon—carbon type.

The presence of $sp^3$ carbon—carbon bonds in coating 3 increases the density and hardness of the coating, thereby enabling it to satisfactorily function in automotive environments. In certain embodiments, taking only a thin layer portion of, or alternatively the entire thickness of, coating 3 into consideration, at least about 15% (more preferably at least about 25%, and most preferably at least about 30%) of the bonds in the coating or coating layer portion are $sp^3$ carbon—carbon (C—C) bonds (as opposed to $sp^2$ carbon—carbon bonds). Coating may or may not include $sp^2$ carbon—carbon bonds in different embodiments (if so, most $sp^2$ carbon—carbon bonds may be provided at the portion of the coating interfacing with the underlying substrate).

In order to improve the hydrophobic nature of coating 3, atoms other than carbon (C) are provided in the coating in different amounts in different embodiments. For example, in certain embodiments of this invention coating 3 (taking the entire coating thickness, or only a thin 10 Å thick layer portion thereof into consideration) may include in addition to the carbon atoms of the $sp^3$ carbon—carbon bonds, by atomic percentage, at least about 5% silicon (Si) atoms (more preferably at least about 15%, and most preferably at least about 20% Si), at least about 5% oxygen (O) atoms (more preferably at least about 15% and most preferably at least about 20% O), at least about 5% hydrogen (H) atoms (more preferably at least about 10% and most preferably at least about 15% H). In certain preferred embodiments, the atomic percentage of C and Si atoms in coating 3 are approximately equal. Optionally, coating 3 may include and from about 0–10% (atomic percentage) fluorine (F) (more preferably from about 0–5% F) in order to further enhance hydrophobic characteristics of the coating.

Figure 2:
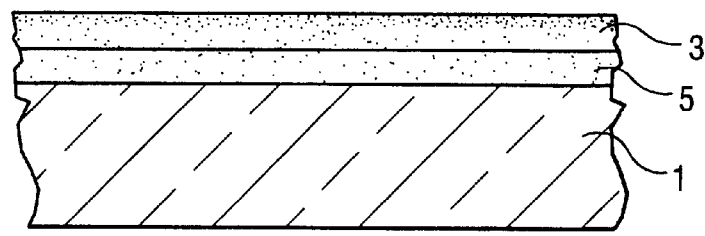
FIG. 2 is a side cross sectional view of a coated article according to another embodiment of this invention, wherein first and second DLC inclusive coatings are provided on a substrate of glass or plastic.
Figure 3:
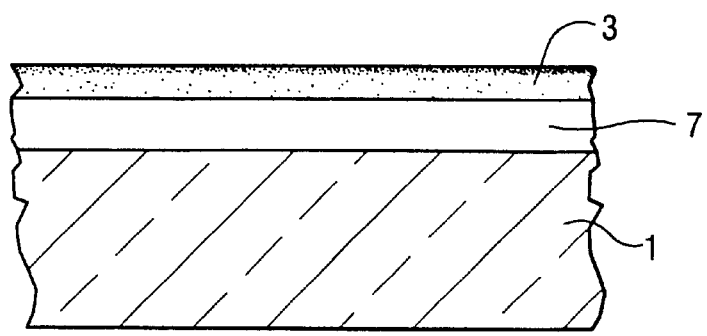
FIG. 3 is a side cross sectional view of a coated article according to yet another embodiment of this invention wherein a low-E or other coating is provided on a substrate, with the hydrophobic DLC inclusive coating(s) of either of the FIG. 1 or FIG. 2 embodiments also on the substrate but over top of the intermediate low-E or other coating.

In certain embodiments, the outermost thin layer portion of hydrophobic coating 3 may also include a larger percentage of H atoms deposited via plasma ion beam treatment relative to the rest of the coating in order to reduce the number of polar bonds at the coating's surface, thereby improving the coating's hydrophobic properties by reducing the polar component of the surface energy. For example, in certain embodiments the outermost 5 Å layer portion of coating 3 may include at least about 10% H atoms, more preferably at least about 25% H atoms, and most preferably at least about 50% H atoms. This higher concentration or percentage of H atoms near the surface of coating 3 is illustrated in FIGS. 1–3 by the dots which become more concentrated near the coating's surface. The deposition of these H atoms near the coating's surface results in a more passive or non-polar coating surface. It is noted that deposition of the H atoms near the coating's surface may tend to etch away any $sp^2$ or graphite C—C bonds in that area. This increase in H near the coating's surface also decreases the coating's density at this outermost 5 Å layer portion.

Accordingly, in certain preferred embodiments of this invention, coating 3 as a whole or any 10 Å thick layer portion thereof (e.g. a 10 Å thick portion near the middle of the coating) may include in atomic percentage: from about 15–80% carbon (C) (mostly via $sp^3$ bonds), from about 5–45% oxygen (O), from about 5–45% silicon (Si), from about 0–30% hydrogen (H), and from about 0–10% fluorine (F). The outermost 5 Å layer portion of coating 3 may include in atomic percentage: from about 5–60% carbon (C) (mostly via $sp^3$ bonds), from about 0–40% oxygen (O), from about 0–40% silicon (Si), from about 10–60% hydrogen (H), and from about 0–10% fluorine (F). As discussed above, additional H may be provided at the outermost portion of layer 3, largely at the expense of C, in order to reduce surface energy. An example of a 10 Å thick layer portion near the middle of coating 3 is as follows, by atomic percentage: 35% C, 30% Si, 15% H, and 20% O. An example of the outermost 5 Å thick layer portion of coating 3 is as follows, by atomic percentage: 20% C, 15% Si, 50% H, and 15% O. Optionally, in certain preferred embodiments, from about 0–5% F may also be provided in this outermost 5 Å thick layer portion. It is noted that many of the Si, H, O, and F atoms in the coating are connected to many carbon atoms via $sp^3$ bonds. A substantial number of Si—O, C—C $sp^3$Si—C $sp^3$, and C—H $sp^3$ bonds are thus present. In certain embodiments, the Si—O bonds tend to cancel out some of the charge due to the carbon thereby reducing surface energy. The presence of the O also reduces density and permits the dispersive component of surface energy to be reduced. These examples are for purposes of example only, and are not intended to be limiting in any way.

In certain preferred embodiments, coating 3 has an average hardness of at least about 10 GPa, more preferably at least about 20 GPa, and most preferably from about 20–50 GPa. Such hardness renders coating 3 resistant to scratching, solvents, and the like. It is noted that the hardness and density of coating 3 and/or layer 5 may be adjusted by varying the ion energy of the depositing apparatus or process described below.

FIG. 2 is a side cross sectional view of a coated article according to another embodiment of this invention, including substrate 1 (e.g. glass), hydrophobic DLC inclusive coating 3 as described above with regard to the FIG. 1 embodiment, and intermediate DLC inclusive layer 5 sandwiched therebetween. In certain embodiments, at least about 35% of the bonds in layer 5 may be of the $sp^3$ C—C type, more preferably at least about 70%, and most preferably at least about 80%. Any of the DLC inclusive layers described in Ser. No. 09/303,548 (incorporated herein by reference)

may be used as layer 5. In effect, layer 5 may function in certain embodiments to reduce corrosion of the coated article (e.g. when the substrate includes Na, or is soda-lime-silica glass), while overlying coating 3 provides a hydrophobic function.

In the FIG. 3 embodiment, a low-E or other coating 7 is provided between substrate 1 and hydrophobic DLC inclusive coating 3. However, coating 3 is still on substrate 1 in the FIG. 3 embodiment. The term "on" herein means that substrate 1 supports DLC coating 3 or any layer portion thereof, regardless of whether or not other layer(s) (e.g. 5, 7) are provided therebetween. Thus, protective coating 3 may be provided directly on substrate 1 as shown in FIG. 1, or may be provided on substrate 1 with a low-E or other coating(s) 5 therebetween as shown in FIGS. 2–3. In still other embodiments, a low-E coating(s) 7 may be provided between hydrophobic coating 3 and DLC layer 5 of the FIG. 2 embodiment).

Exemplar coatings (in full or any portion of these coatings) that may be used as low-E or other coating(s) 7 are shown and/or described in any of U.S. Pat. Nos. 5,837,108, 5,800,933, 5,770,321, 5,557,462, 5,514,476, 5,425,861, 5,344,718, 5,376,455, 5,298,048, 5,242,560, 5,229,194, 5,188,887 and 4,960,645, which are all hereby incorporated herein by reference. Silicon oxide and/or silicon nitride coating(s) may also be used as coating(s) 7.

As will be discussed in more detail below, highly tetrahedral amorphous carbon (ta—C) forms $sp^3$ carbon—carbon bonds, and is a special form of diamond-like carbon (DLC). The amounts of $sp^3$ bonds may be measured using Raman finger-printing and/or electron energy loss spectroscopy. A high amount of $sp^3$ bonds increases the density of a layer, thereby making it stronger and allowing it to reduce soda diffusion to the surface of the coated article. However, in certain embodiments, there is a lesser percentage of such bonds at the outmost layer portion of coating 3 than at middle areas of the coating, so that H atoms may be provided in order to improve the coating's hydrophobic characteristics.

Figure 4:
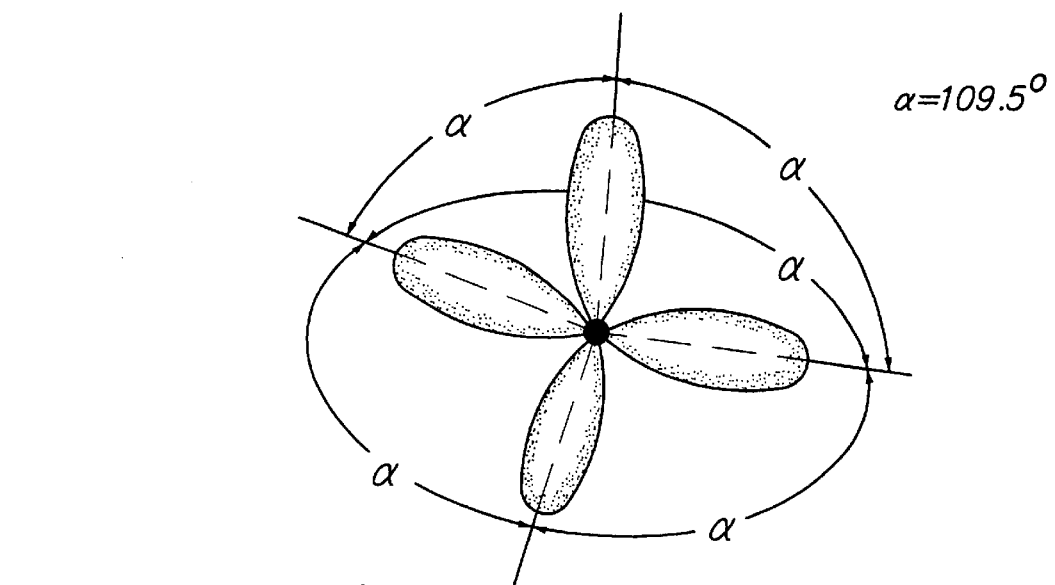
FIG. 4 illustrates exemplar $sp^3$ orbitals of carbon in a tetrahedral state.
Figure 5:
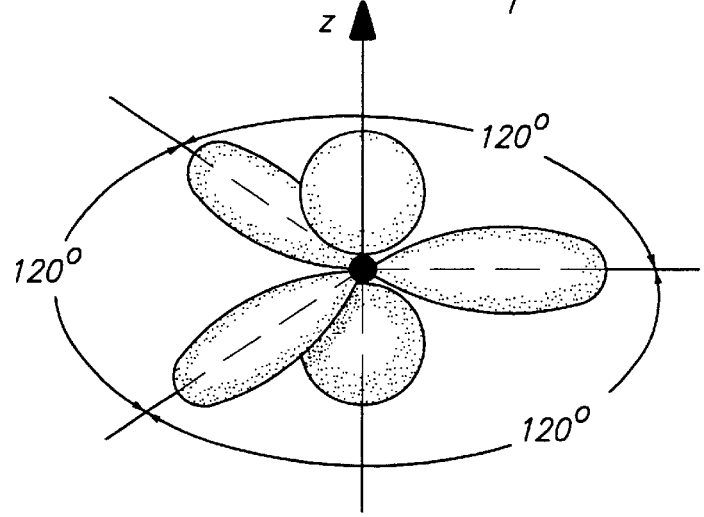
FIG. 5 illustrates exemplar orbitals of carbon in a $sp^2$ state (i.e. graphitic).
Figure 6:
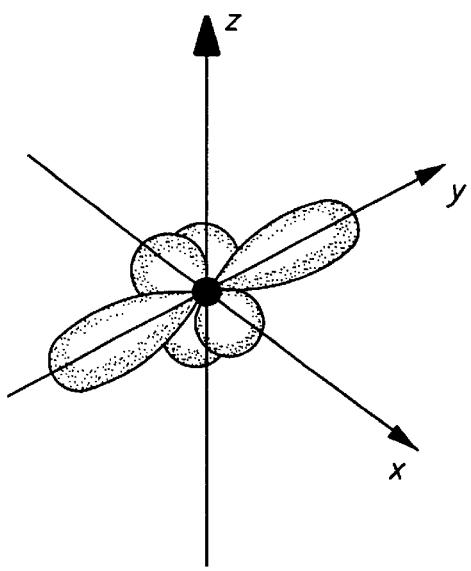
FIG. 6 illustrates exemplar sp hybridizations of a carbon atom.
Figure 7:
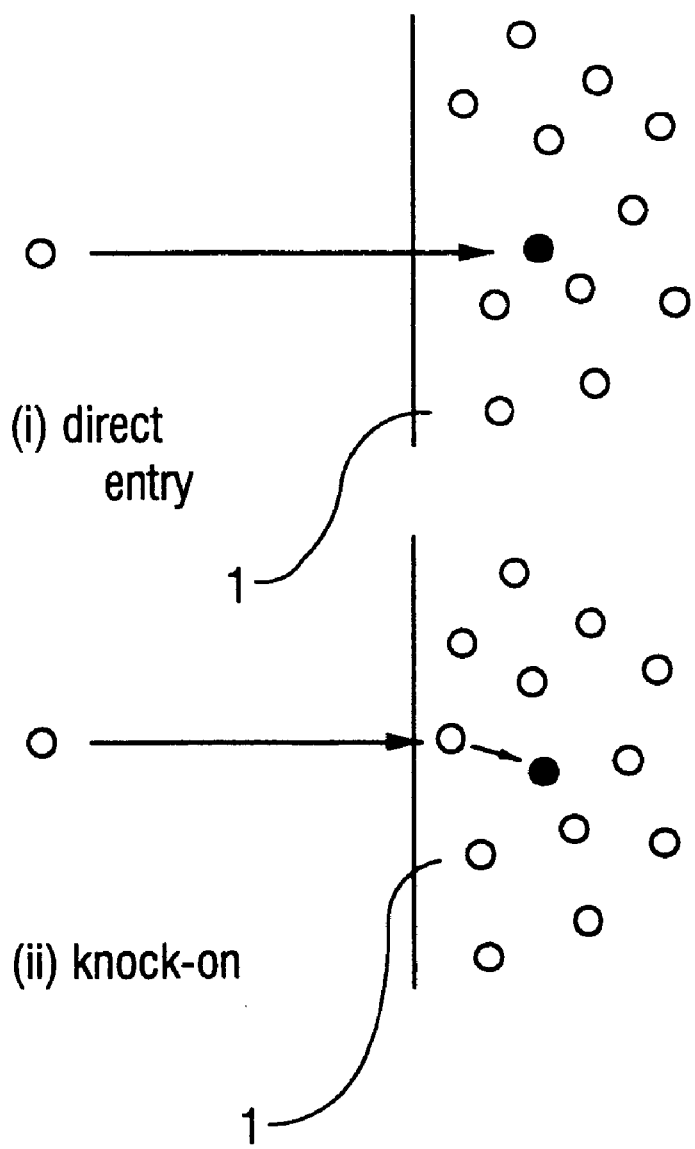
FIG. 7 is a side cross sectional view of carbon ions penetrating the substrate or growing DLC coating surface so as to strongly bond a DLC layer to an underlying DLC layer or other substrate according to any embodiment herein.

For purposes of simplicity, FIG. 4 illustrates orbitals of a C atom in a tetrahedral or $sp^3$ state (i.e. capable of forming carbon to carbon $sp^3$ diamond like bonds) in coating 3 or layer 5. FIG. 5 is an example of $sp^2$ C orbitals, and FIG. 6 an example of sp hybridization of a carbon atom. It would be recognized by those of skill in the art that the angles shown in FIGS. 4–5 are for purposes of example only, are not limiting, and may be changed in different embodiments of this invention. Thus, regarding FIG. 4 for example, in certain embodiments of this invention orbitals in C—C $sp^3$ bonds may be from about 100–120 degrees apart. The angles of FIG. 5 may vary in a similar manner.

In certain embodiments, coating 3 is at least about 75% transparent to or transmissive of visible light rays, preferably at least about 85%, and most preferably at least about 95%.

When substrate 1 is of glass, it may be from about 1.5 to 5.0 mm thick, preferably from about 2.3 to 4.8 mm thick, and most preferably from about 3.7 to 4.8 mm thick. Thus, ta—C inclusive coating 3 and/or layer 5 reduce the amount of soda that can reach the surface of the coated article and cause stains/corrosion. In certain embodiments, substrate 1 includes, on a weight basis, from about 60–80% $SiO_2$, from about 10–20% $Na_2O$, from about 0–16% CaO, from about 0–10% $K_2O$, from about 0–10% MgO, and from about 0–5% $Al_2O_3$. In certain other embodiments, substrate 1 may be soda lime silica glass including, on a weight basis, from about 66–75% $SiO_2$, from about 10–20% $Na_2O$, from about 5–15% CaO, from about 0–5% MgO, from about 0–5% $Al_2O_3$, and from about 0–5% $K_2O$. Most preferably, substrate 1 is soda lime silica glass including, by weight, from about 70–74% $SiO_2$, from about 12–16% $Na_2O$, from about 7–12% CaO, from about 3.5 to 4.5% MgO, from about 0 to 2.0% $Al_2O_3$, from about 0–5% $K_2O$, and from about 0.08 to 0.15% iron oxide. Soda lime silica glass according to any of the above embodiments may have a density of from about 150 to 160 pounds percubic foot (preferably about 156), an average short term bending strength of from about 6,500 to 7,500 psi (preferably about 7,000 psi), a specific heat (0–100 degrees C.) of about 0.20 Btu/lbF, a softening point of from about 1330 to 1345 degrees F., a thermal conductivity of from about 0.52 to 0.57 Btu/hrftF, and a coefficient of linear expansion (room temperature to 350 degrees C.) of from about 4.7 to $5.0 \times 10^{-6}$ degrees F. In certain embodiments, any glass disclosed in U.S. Pat. No. 5,214,008 or U.S. Pat. No. 5,877,103, each incorporated herein by reference, may be used as substrate 1. Also, soda lime silica float glass available from Guardian Industries Corp., Auburn Hills, Mich., may be used as substrate 1.

Any such aforesaid glass substrate 1 may be, for example, green, blue or grey in color when appropriate colorant(s) are provided in the glass in certain embodiments.

In certain other embodiments of this invention, substrate 1 may be of borosilicate glass, or of substantially transparent plastic. In certain borosilicate embodiments, the substrate 1 may include from about 75–85% $SiO_2$, from about 0–5% $Na_2O$, from about 0 to 4% $Al_2O_3$, from about 0–5% $K_2O$, from about 8–15% $B_2O_3$, and from about 0–5% $Li_2O$.

In still further embodiments, an automotive window (e.g. windshield or side window) including any of the above glass substrates laminated to a plastic substrate may combine to make up substrate 1, with the coating 3 of any of the FIGS. 1–3 embodiments provided on the outside surface of such a window. In other embodiments, substrate 1 may include first and second glass sheets of any of the above mentioned glass materials laminated to one another, for use in window (e.g. automotive windshield, residential window, commercial architectural window, automotive side window, vacuum IG window, automotive backlight or back window, etc.) and other similar environments.

When substrate 1 of any of the aforesaid materials is coated with at least DLC coating 3 according to any of the FIGS. 1–3 embodiments, the resulting coated article has the following characteristics in certain embodiments: visible transmittance (Ill. A) greater than about 60% (preferably greater than about 70%, and most preferably greater than about 80%), UV (ultraviolet) transmittance less than about 38%, total solar transmittance less than about 45%, and IR (infrared) transmittance less than about 35% (preferably less than about 25%, and most preferably less than about 21%). Visible, "total solar", UV, and IR transmittance measuring techniques are set forth in U.S. Pat. No. 5,800,933, as well as the '008 patent, incorporated herein by reference.

Figure 11:
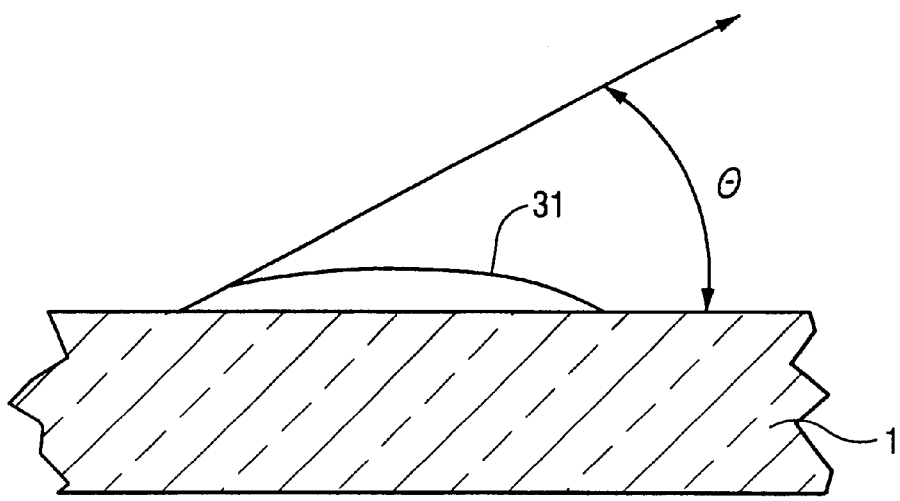
FIG. 11 is a side cross sectional partially schematic view illustrating a low contact angle $\theta$ of a drop on a glass substrate.
Figure 12:
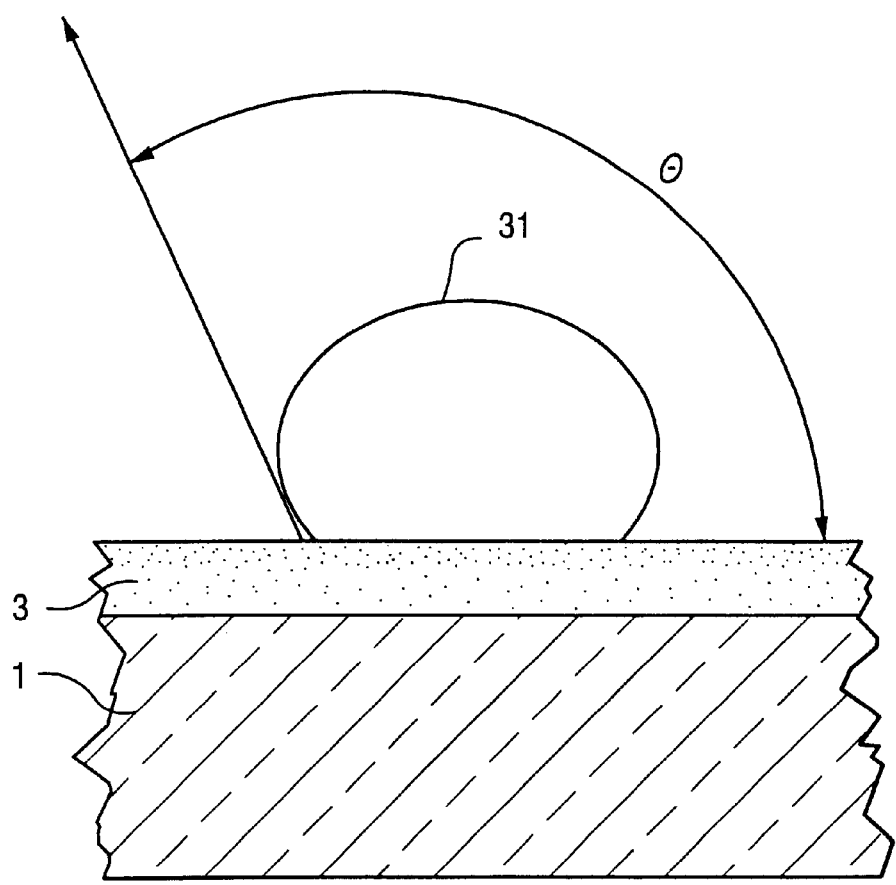
FIG. 12 is a side cross sectional partially schematic view illustrating-the coated article of the FIG. 1 embodiment and the contact angle $\theta$ of a water drop thereon.

Hydrophobic performance of coating 3 in any of the above embodiments is a function of contact angle θ, surface energy γ, and wettability or adhesion energy W. The surface energy γ of coating 3 may be calculated by measuring its contact angle θ (contact angle θ is illustrated in FIGS. 11–12). A sessile drop 31 of a liquid such as water is placed on the coating as shown in FIG. 12. A contact angle θ between the drop 31 and underlying coating 31 appears, defining an angle depending upon the interface tension between the three phases in the point of contact. Generally, the surface energy $\gamma_C$ of coating 3 can be determined by the addition of a polar and a dispersive component, as follows: $\gamma_C=\gamma_{CP}+\gamma_{CD}$, where $\gamma_{CP}$ is the coating's polar component and $\gamma_{CD}$ the coating's dispersive component. The polar component of the surface energy represents the interactions of the surface which is mainly based on dipoles, while the dispersive component represents, for example, van der Waals forces, based upon electronic interactions. Generally speaking, the lower the surface energy $\gamma_C$ of coating 3, the more hydrophobic the coating and the higher the contact angle θ.

Adhesion energy (or wettability) W can be understood as an interaction between polar with polar, and dispersive with dispersive forces, between coating 3 and a liquid thereon such as water. $\gamma^P$ is the product of the polar aspects of liquid tension and coating/substrate tension; while $\gamma^F$ is the product of the dispersive forces of liquid tension and coating/substrate tension. In other words, $\gamma^P=\gamma_{LP}*\gamma_{CP}$; and $\gamma^D=\gamma_{LD}*\gamma_{CD}$; where $\gamma_{LP}$ is the polar aspect of the liquid (e.g. water), $\gamma_{CP}$ is the polar aspect of coating 3; $\gamma_{LD}$ is the dispersive aspect of liquid (e.g. water), and $\gamma_{CD}$ is the dispersive aspect of coating 3. It is noted that adhesion energy (or effective interactive energy) W, using the extended Fowkes equation, may be determined by:

$$W=[\gamma_{LP}*\gamma_{CP}]^{1/2}+[\gamma_{LD}*\gamma_{CD}]^{1/2}=\gamma_1(1+\cos\theta),$$ where $\gamma_1$ is liquid tension and θ is the contact angle. W of two materials (e.g. coating 3 and water thereon) is a measure of wettability indicative of how hydrophobic the coating is.

When analyzing the degree of hydrophobicity of coating 3 with regard to water, it is noted that for water $\gamma_{LP}$ is 51 mN/m and $\gamma_{LD}$ is 22 mN/m. In certain embodiments of this invention, the polar aspect $\gamma_{CP}$ of surface energy of coating 3 is from about 0 to 0.2 (more preferably variable or tunable between 0 and 0.1) and the dispersive aspect $\gamma_{CD}$ of the surface energy of coating 3 is from about 16–22 mN/m (more preferably from about 16–20 mN/m).

Using the above-listed numbers, according to certain embodiments of this invention, the surface energy $\gamma_C$ of coating 3 is less than or equal to about 20.2 mN/m, more preferably less than or equal to about 19.5 mN/m, and most preferably less than or equal to about 18.0 mN/m; and the adhesion energy W between water and coating 3 is less than about 25 mN/m, more preferably less than about 23 mN/m, even more preferably less than about 20 mN/m, and most preferably less than about 19 mN/m. These low values of adhesion energy W and coating 3 surface energy $\gamma_C$, and the high initial contact angles θ achievable, illustrate the improved hydrophobic nature of coatings 3 according to different embodiments of this invention.

The initial contact angle θ of a conventional glass substrate 1 with sessile water drop 31 thereon is typically from about 22–24 degrees, as illustrated in FIG. 11. Thus, conventional glass substrates are not particularly hydrophobic in nature. The provision of coating(s) 3 on substrate 1 causes the contact angle θ to increase to the angles discussed above, as shown in FIG. 12 for example, thereby improving the hydrophobic nature of the article. As discussed in Table 1 of commonly owned Se. No. 09/303,548, the contact angle θ of a ta—C DLC layer is typically from about 5 to 50 degrees. However, the makeup of DLC-inclusive coating 3 described herein enables the initial contact angle θ between coating 3 and a water drop (i.e. sessile drop 31 of water) to be increased in certain embodiments to at least about 100 degrees, more preferably at least about 110 degrees, even more preferably at least about 115 degrees, and most preferably at least about 125 degrees, thereby improving the hydrophobic characteristics of the DLC-inclusive material. An "initial" contact angle θ means prior to exposure to environmental conditions such as sun, rain, humidity, etc.

Figure 8:
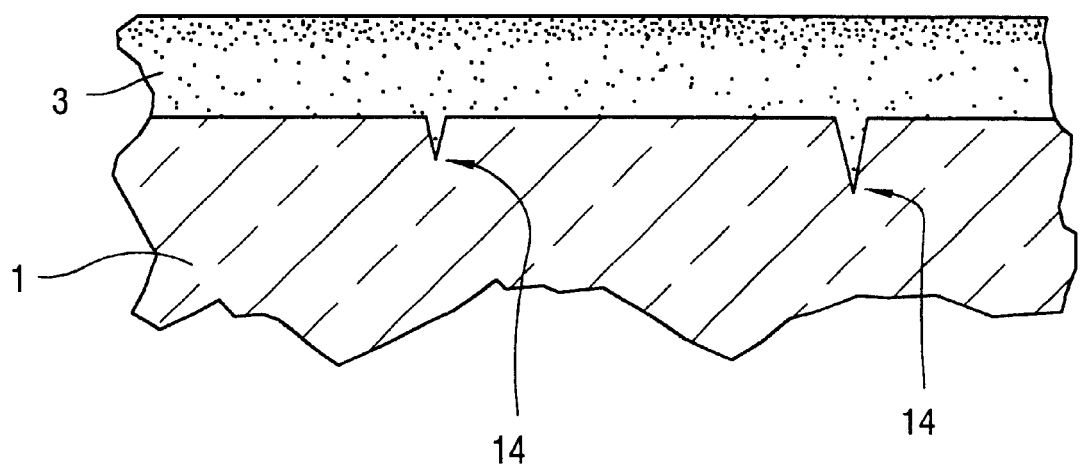
FIG. 8 is a side cross sectional view of a coated glass substrate according to an embodiment of this invention, illustrating at least DLC bonds of the coating penetrating cracks in the surface of a glass substrate.

Referring to FIG. 8, it is noted that the surface of a glass substrate 1 often has tiny cracks or microcracks defined therein. These cracks may weaken glass by orders of magnitude, especially when water seeps therein and ruptures further bonds. Another advantage of certain embodiments of this invention is that amorphous carbon atoms and/or networks of DLC inclusive coating 3 (or DLC inclusive layer 5) fill in or collect in these small cracks because of the small size of carbon atoms (e.g. less than about 100 pm radius atomic, most preferably less than about 80 pm, and most preferably about 76.7 pm) and because of the ion energy of 200 to 1,000 eV, preferably about 400–500 eV, and momentum. This increases the mechanical strength of the glass 1. The nanocracks in the glass surface shown in FIG. 8 may sometimes be from about 0.4 nm to 1 nm in width. The inert nature and size of the carbon atoms in these nonocracks will prevent water from attacking bonds at the crack tip 14 and weakening the glass. The carbon atoms make their way to positions adjacent the tips 14 of these cracks, due to their size and energy. Tips 14 of these cracks are, typically, from about 0.5 to 50 nm below the glass substrate surface.

Figure 9:
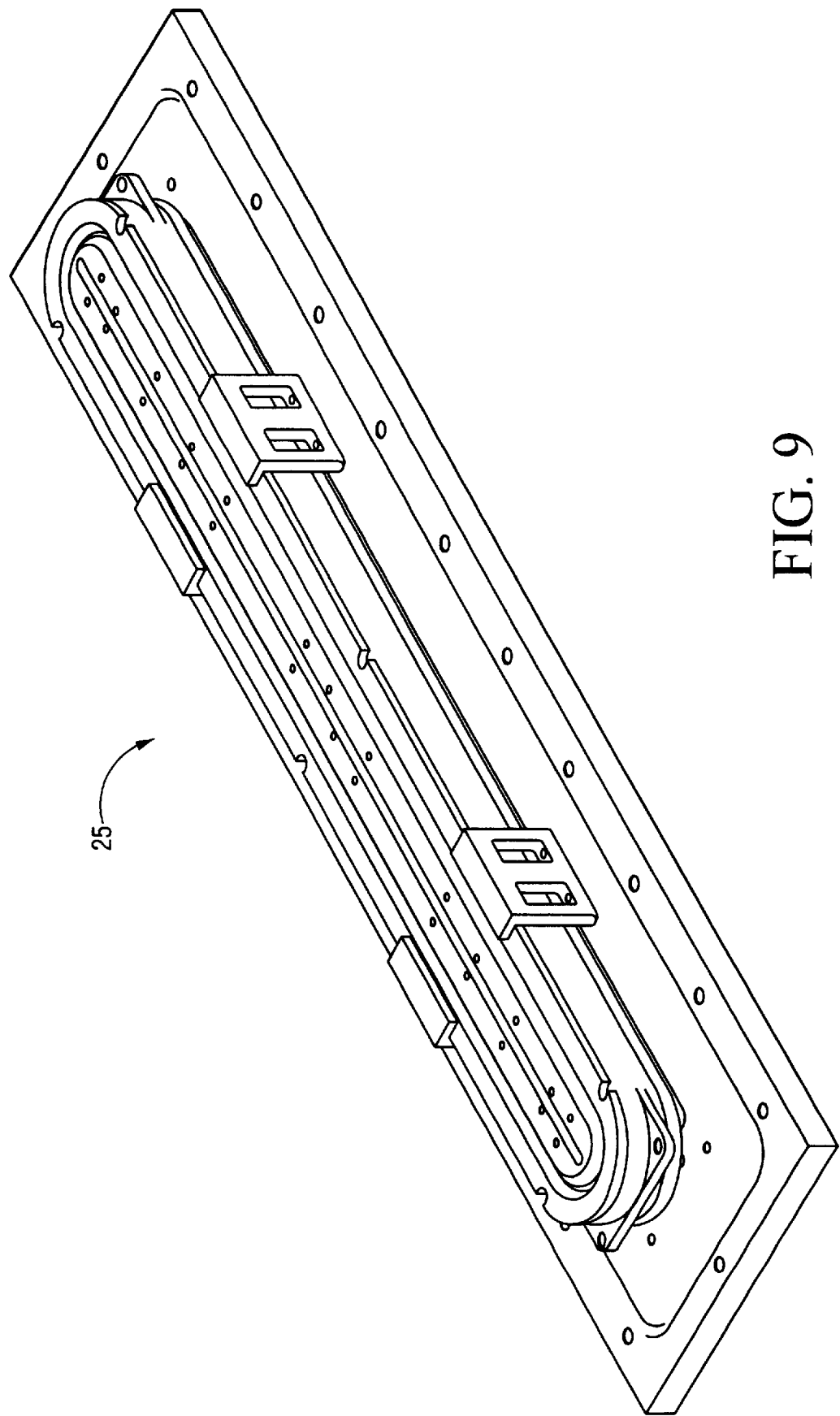
FIG. 9 is a perspective view of a linear ion beam source which may be used in any embodiment of this invention for depositing a DLC inclusive coating.
Figure 10:
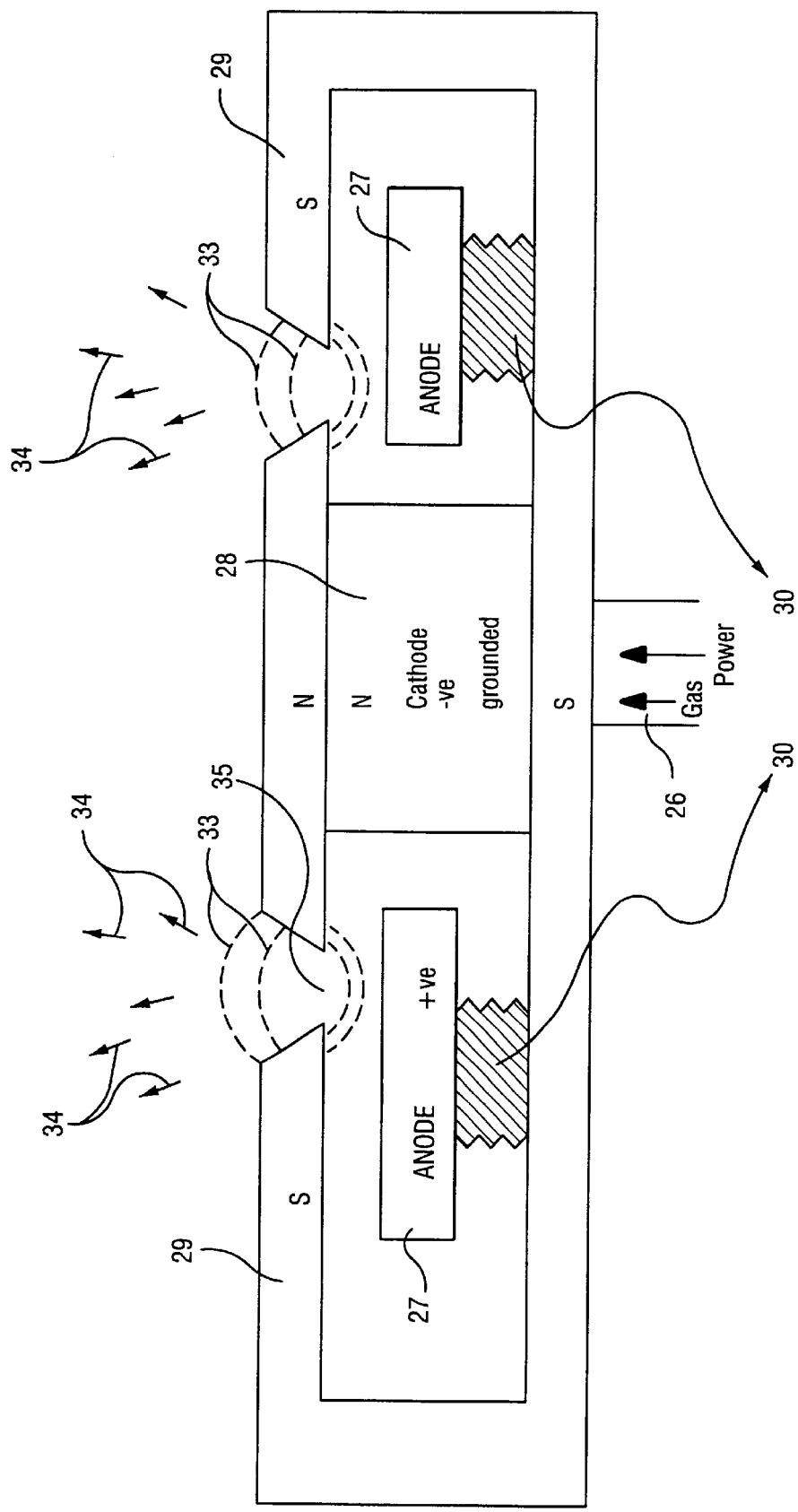
FIG. 10 is a cross sectional view of the linear ion beam source of FIG. 9.

FIGS. 9–10 illustrate an exemplary linear or direct ion beam source 25 which may be used to deposit coating 3, layer 5, clean a substrate, or surface plasma treat a DLC inclusive coating according to different embodiments of this invention. Ion beam source 25 includes gas/power inlet 26, anode 27, grounded cathode magnet portion 28, magnet poles 29, and insulators 30. A 3 kV DC power supply may be used for source 25 in some embodiments. Linear source ion deposition allows for substantially uniform deposition of coating 3 as to thickness and stoichiometry.

Ion beam source 25 is based upon a known gridless ion source design. The linear source is composed of a linear shell (which is the cathode and grounded) inside of which lies a concentric anode (which is at a positive potential). This geometry of cathode-anode and magnetic field 33 gives rise to a close drift condition. The magnetic field configuration further gives rise to an anode layer that allows the linear ion beam source to work absent any electron emitter. The anode layer ion source can also work in a reactive mode (e.g. with oxygen and nitrogen). The source includes a metal housing with a slit in a shape of a race track as shown in FIGS. 9–10. The hollow housing is at ground potential. The anode electrode is situated within the cathode body (though electrically insulated) and is positioned just below the slit. The anode can be connected to a positive potential as high was 3,000 volts. Both electrodes may be water cooled in certain embodiments. Feedstock gases are fed through the cavity between the anode and cathode. The linear ion source also contains a labyrinth system that distributes the precursor gas (e.g. gaseous mixture of TMS (i.e. $(CH_3)_4Si$ or tetramethyl silane) and $O_2$; or mixture of 3MS (i.e. $(CH_3)_3Si$—H) and $O_2$) evenly along its length and which allows it to supersonically expand between the anode-cathode space internally. TMS and 3MS are commercial available from Dow Chemical. The electrical energy then cracks the gas to produce a plasma within the source. The ions are expelled out at energies in the order of eVc-a/2 when the voltage is Vc-a. The ion beam emanating from the slit is approximately uniform in the longitudinal direction and has a gaussian profile in the transverse direction. Exemplary ions 34 are shown in FIG. 10. A source as long as one meter may be made, although sources of different lengths are anticipated in different embodiments of this invention. Finally, electron layer 35 is shown in FIG. 10 completes the circuit thereby enabling the ion beam source to function properly.

Figure 13:
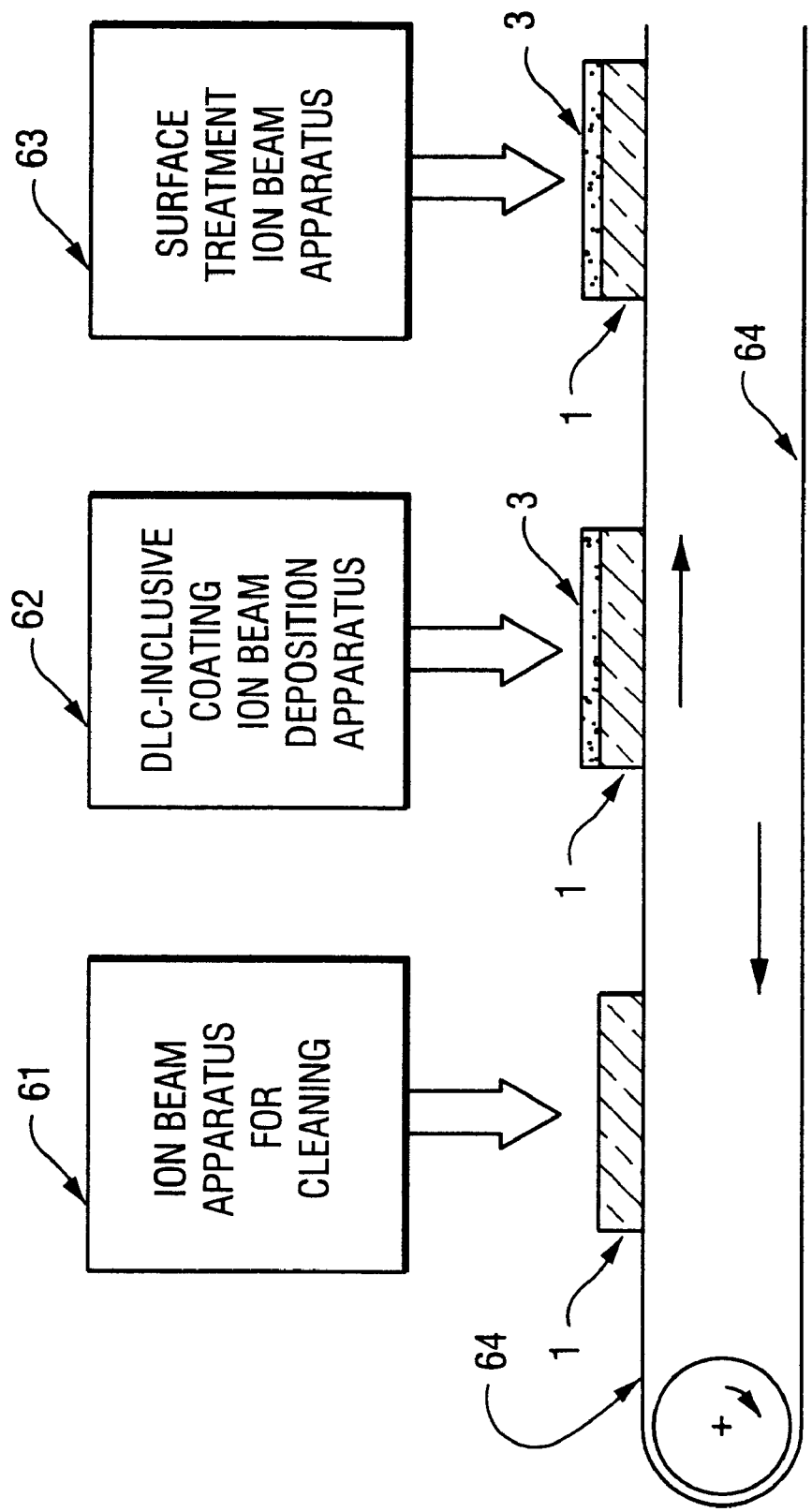
FIG. 13 is a schematic diagram of an assembly for manufacturing a coated article according to an embodiment of this invention.

FIG. 13 illustrates an assembly for manufacturing a coated article according to any of the FIGS. 1–2 embodiments of this invention; the assembly including first, second, and third linear ion beam sources 61, 62 and 63, respectively. These three ion beam sources may be of the type shown in FIGS. 9–10, or alternatively may be other types of ion beam sources (e.g. filtered arc type on beam sources). Conveyor 64 functions to move substrates through the assembly, from one source to the next.

Referring to FIGS. 1, 9, 10, 12 and 13, an exemplary method of depositing a coating 3 on substrate 1 will now be described. This method is for purposes of example only.

Prior to coating 3 being formed on glass substrate 1, the top surface of substrate 1 is preferably cleaned by way of first linear or direct ion beam source 61. For example, a glow discharge in argon (Ar) gas or mixtures of $Ar/O_2$ (alternatively $CF_4$ plasma) may be used to remove any impurities on the substrate surface, by source 61. Such interactions are physio-chemical in nature. This cleaning creates free radicals on the substrate surface that subsequently can be reacted with other monomers yielding substrate surfaces with specialized properties. The power used may be from about 100–300 Watts. Substrate 1 may also be cleaned by, for example, sputter cleaning the substrate prior to actual deposition of coating 3; using oxygen and/or carbon atoms at an ion energy of from about 800 to 1200 eV, most preferably about 1,000 eV.

After cleaning, the deposition process begins using a linear ion beam deposition technique via second ion beam source 62; with conveyor 64 having moved the cleaned substrate 1 from first source 61 to a position under second source 62 as shown in FIG. 13. Ion beam source 62 functions to deposit a ta—C/SiO (or ta—C/SiO:F in alternative embodiments) coating 3 onto substrate 1, as follows. In preferred embodiments, the ratio of C to Si in coating 3 is approximately 1:1 (i.e. 1:1 plus/minus about 20%). However, in other preferred embodiments (e.g. see XPS analyzed Sample Nos. 1–3 below), the ratio of C to Si in coating 3 may be from about 1:1 to 4:1. The dopant gas may be produced by bubbling a carrier gas (e.g. $C_2H_2$) through the precursor monomer (e.g. TMS or 3MS) held at about 70 degrees C (well below the flashing point). Acetylene feedstock gas ($C_2H_2$) is used in certain embodiments to prevent or minimize/reduce polymerization and to obtain an appropriate energy to allow the ions to penetrate the substrate 1 or other surface and subimplant therein, thereby causing coating 3 atoms to intermix with the surface of substrate 1 (or the surface of the growing coating) a few atom layers thereinto. In alternative embodiments, the dopant gas may be produced by heating or warming the monomer (e.g. to about 25–30 degrees C.) so that vapor therefrom proceeds through a mass flow controller to the ion beam source; so that $C_2H_2$ is not needed. The actual gas flow may be controlled by a mass flow controller (MFC) which may be heated to about 70 degrees C. Oxygen ($O_2$) gas is independently flowed through an MFC. In certain embodiments, a target consisting essentially of approximately equal molar percentages of C and Si may be isostatically compressed at about 20 MPa. The temperature of substrate 1 may be room temperature; an arc power of about 1000 W may be used; precursor gas flow may be about 25 sccm; the base pressure may be about $10^{-6}$ Torr, and a Hoescht type carbon electrode may be used. Coating 3 is preferably free of pinholes to achieve satisfactory water repulsion and/or suppression of soda diffusion.

The C—C $sp^3$ bonding in coating 3 is preferably formed by having a predetermined range of ion energy prior to reaching substrate 1, or prior to reaching a coating or layer growing on the substrate. The optimal ion energy window for the majority of coating 3 is from about 100–200 eV (preferably from about 100–150 eV) per carbon ion. At these energies, the carbon in coating 3 (and layer 5) emulates diamond, and $sp^3$ C—C bonds form in coating 3. However, compressive stresses can develop in ta—C when being deposited at 100–150 eV. Such stress can reach as high as 10 GPa and can potentially cause delamination from many substrates. It has been found that these stresses can be controlled and decreased by increasing the ion energy during the deposition process to a range of from about 200–1,000 eV. The plasma ion beam source enables ion energy to be controlled within different ranges in an industrial process for large area deposition utilized herein. The compressive stress in amorphous carbon is thus decreased significantly at this higher ion energy range of 200–1,000 eV.

High stress is undesirable in the thin interfacing portion of coating 3 that directly contacts the surface of a glass substrate 1 in the FIG. 1 embodiment (and the thin interfacing layer portion of layer 5 in the FIG. 2 embodiment). Thus, for example, the first 1–40% thickness (preferably the first 1–20% and most preferably the first 5–10% thickness) of coating 3 (or layer 5) is deposited on substrate 1 using high anti-stress energy levels of from about 200–1,000 eV, preferably from about 400–500 eV. Then, after this initial interfacing layer portion of coating 3 has been grown, the ion energy in the ion deposition process is decreased (either quickly or gradually while deposition continues) to about 100–200 eV, preferably from about 100–150 eV, to grow the remainder of coating 3 (or layer 5). Thus, in certain embodiments, because of the adjustment in ion energy during the deposition process, DLC inclusive coating 3 in FIGS. 1–3 has different densities and different percentages of $sp^3$ C—C bonds at different layer portions thereof (the lower the ion energy, the more $sp^3$ C—C bonds and the higher the density).

While direct ion beam deposition techniques are preferred in certain embodiments, other methods of deposition may also be used in different embodiments. For example, filtered cathodic vacuum arc ion beam techniques may be used to deposit coating 3 and/or layer 5. Also, in certain embodiments, $CH_4$ may be used as a feedstock gas during the deposition process instead of or in combination with the aforesaid $C_2H_2$ gas. Alternatively, any of the deposition methods disclosed in U.S. Pat. No. 5,858,477 may be used to deposit coating 3 and/or layer 5, the disclosure of U.S. Pat. No. 5,858,477 hereby being incorporated herein by reference.

In certain alternative embodiments of this invention, second source 62 may deposit a ta—C:SiO:F coating 3 on substrate 1 instead of a ta—C:SiO coating. The n, k and Tauc optical bandgap may be tailored by doping the bulk of coating 3 with F and/or H; where "n" is refractive index and "k" is extinction coefficient. As the refractive index n of glass is approximately 1.5, it is desirable in certain embodiments for the refractive index n of coating 3 to be close to that of the underlying glass substrate 1 in order to achieve good transmission and minimal reflection of the coated article. It is also desirable in certain embodiments for the "k" value to be low in order to achieve good transmission. In certain embodiments, the refractive index of coating 3 is from about 1.4 to 2.0, more preferably no greater than about 1.75, and most preferably from about 1.5 to 1.7. The refractive index n of the coating can also be altered using $CF_4$ or $CF_6$ as the doping gas. Fluorination of no more than about 5% atomic is preferred. The table below shows variation of n & k with atomic F content:

| F % | n @ 543 nm | k @ 43 nm | Eg(eV) |
|---|---|---|---|
| 0 | 2.2 | 0.02 | 2.0 |
| 1.5 | 1.75 | 0.007 | 2.9 |
| 3.0 | 1.65 | 0.0001 | 3.7 |

Thus, fluorination provides a way in which to independently tune the n & k to match desired optical properties of the substrate 1 in order to improve transmission and the like. Fluorination may also scavenge a graphitic $sp^2$ fraction within the carbon matrix thus leaving mostly $sp^3$ enriched carbon matrix.

Third ion beam source 63 is optional. In certain embodiments of this invention, the hydrophobicity of coating 3 can be further enhanced using a plasma treatment by another source 63 or grafting procedure after the main portion of DLC-inclusive coating 3 has been deposited. This technique using third source 63 removes certain polar functional groups at the outermost surface, thereby altering the surface chemical reactivity (i.e. lowering surface energy) while the bulk of coating 3 remains the same or substantially unaffected. After conveyor has moved the DLC-coated substrate from the second source 62 station to a position under third source 63, the plasma treatment by source 63 introduces hydrogen (H) atoms into the outermost surface of coating 3, thereby making the coating's surface substantially non-polar and less dense than the rest of the coating 3. These H atoms are introduced, because $H_2$ or $ArH_2$ feedstock gas is used by source 63 instead of the $C_2H_2$ gas. Thus, third source 63 does not deposit any significant amounts of C atoms or Si atoms; but instead treats the outermost surface of the ta—C:SiO coating by adding H atoms thereto in order to improve its hydrophobic characteristics. This plasma treatment may also function to roughen the otherwise smooth surface. It is noted that $H_2$ feedstock gas is preferred in ion beam source 63 when it is not desired to roughen the surface of coating 3, while $ArH_2$ feedstock gas is preferred in surface roughing embodiments. Additionally, a $CF_4$ RF induced plasma may be used to provide a striation process with RMS roughness of at least about 100 A.

Contact angle θ of coating 3 with water increases with surface roughness as shown below, via certain examples performed in accordance with certain embodiments of this invention:

| Sample No. | Roughness RMS (Å) | Contact Angle θ |
|---|---|---|
| 1 | 5 | 101° |
| 2 | 30 | 109° |
| 3 | 120 | 117° |

In certain alternative embodiments of this invention, third source 63 may be used to introduce F atoms to the outermost 5 Å layer portion of coating 3 (in addition to or instead of the H atoms) in order to reduce surface energy. Fluorination of no more than about 5% (atomic percent) is preferred.

Coatings 3 according to different embodiments of this invention may have the following characteristics: coefficient of friction of from about 0.02 to 0.15; good abrasion resistance; an average density of from about 2.5 to 3.0 $g/cm^2$; permeability barrier to gases and ions; surface rough- ness less than about 0.5 nm; inert reactivity to acids, alkalis, solvents, salts and water; corrosion resistance; variable or tunable surface tension; tunable optical bandgap of from about 2.0 to 3.7 eV; IR transmission @ 10 μm of at least about 85%; UV transmission @ 350 nm of no greater than about 30%; tunable refractive index @ 550 nm [n=1.6 to 2.3; k=0.0001 to 0.1], permittivity @ GHz 4.5; an undoped electrical resistivity of at least about $10^{10}$ Ω/cm; dielectric constant of about 11 @ 10 kHz and 4 @ 100 MHZ; an electrical breakdown strength (V $cm^{-1}$) of about $10^6$; thermal coefficient of expansion of about $9 \times 10^{-6}$/C; and thermal conductivity of about 0.1 Wcm K.

Referring to FIG. 13, in certain preferred embodiments of this invention, three separate ion beam sources 61–63 are used to make coated articles according to either of the FIG. 1–2 embodiments. However, in alternative embodiments, it is recognized that a single ion beam source (linear, curved, or the like) may be used to perform each of the cleaning step, the deposition step of DLC-inclusive coating 3, and the plasma surface treatment for introducing H and/or F atoms into the outermost surface area of the coating. In such embodiments, the feedstock gas may be changed between each such process.

ADDITIONAL EXAMPLE SAMPLE NOS. 1–3

Three additional example coated articles were manufactured and tested according to different embodiments of this invention as follows. They are additional Sample Nos. 1–3, each including a coating 3 according to an embodiment of this invention deposited on glass using tetramethyl-silane (TMS) and $O_2$ gas introduced within the linear ion beam. All sample coatings 3 were of approximately the same thickness of about 750 Å. A low energy electron flood gun was used to sharpen the spectral analysis conducted by x-ray photo electron spectroscopy (XPS) for chemical analysis. In XPS analysis of a coating 3, high energy x-ray photons (monochromatic) impinge on the surface of coating 3. Electrons from the surface are ejected and their energy and number (count) measured. With these measurements, one can deduce the electron binding energy. From the binding energy, one can determine three things: elemental fingerprinting, relative quantity of elements, and the chemical state of the elements (i.e. how they are bonding). Components used in the XPS analysis (e.g. see FIGS. 14–15) include the monochromatic x-ray source, an electron energy analyzer, and electron flood gun to prevent samples from charging up; and an ion source used to clean and depth profile. Photoelectrons are collected from the entire XPS field simultaneously, and using a combination of lenses before and after the energy analyzer are energy filtered and brought to a channel plate. The result is parallel imaging in real time images. Sample Nos. 1–3 were made and analyzed using XPS, which indicated that the samples included the following chemical elements by atomic percentage (H was excluded from the chart below).

| Sample No. | C | O | Si | F |
|---|---|---|---|---|
| 1 | 54.6% | 23.7% | 20.5% | 1.2% |
| 2. | 45.7% | 21.7% | 32.7% | 0% |
| 3. | 59.5% | 22.7% | 17.8% | 0% |

H was excluded from the XPS analysis because of its difficulty to measure. Thus, H atoms present in the coating Sample Nos. 1–3 were not taken into consideration for these results. For example, if Sample No. 1 included 9% H by atomic percentage, then the atomic percentages of each of the above-listed elements C, O, Si and F would be reduced by an amount so that all five atomic percentages totaled 100%.

Figure 14:
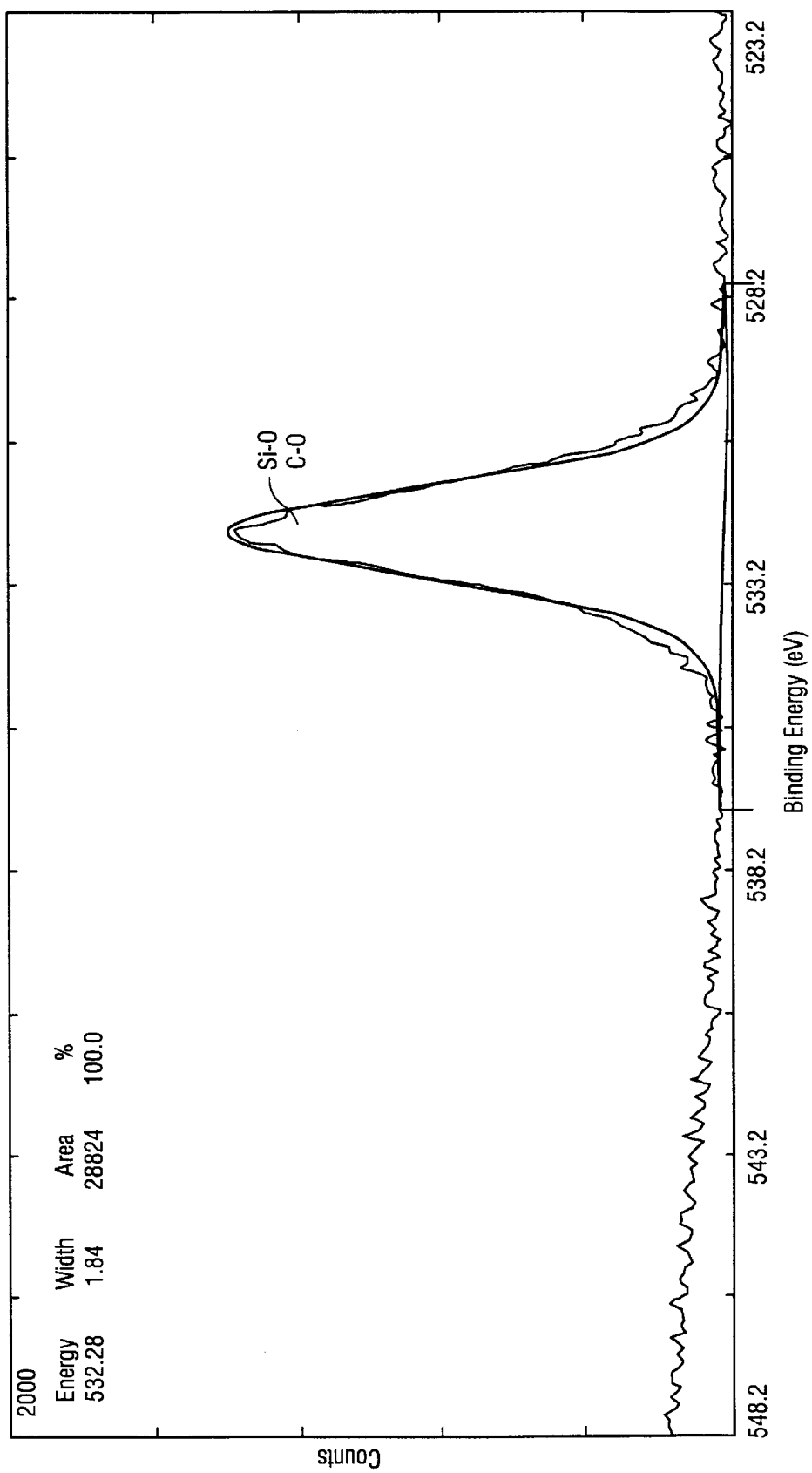
FIG. 14 is a binding energy (eV) versus counts graph of a coated article according to an embodiment of this invention, taken by x-ray photo electron spectroscopy (XPS).
Figure 15:
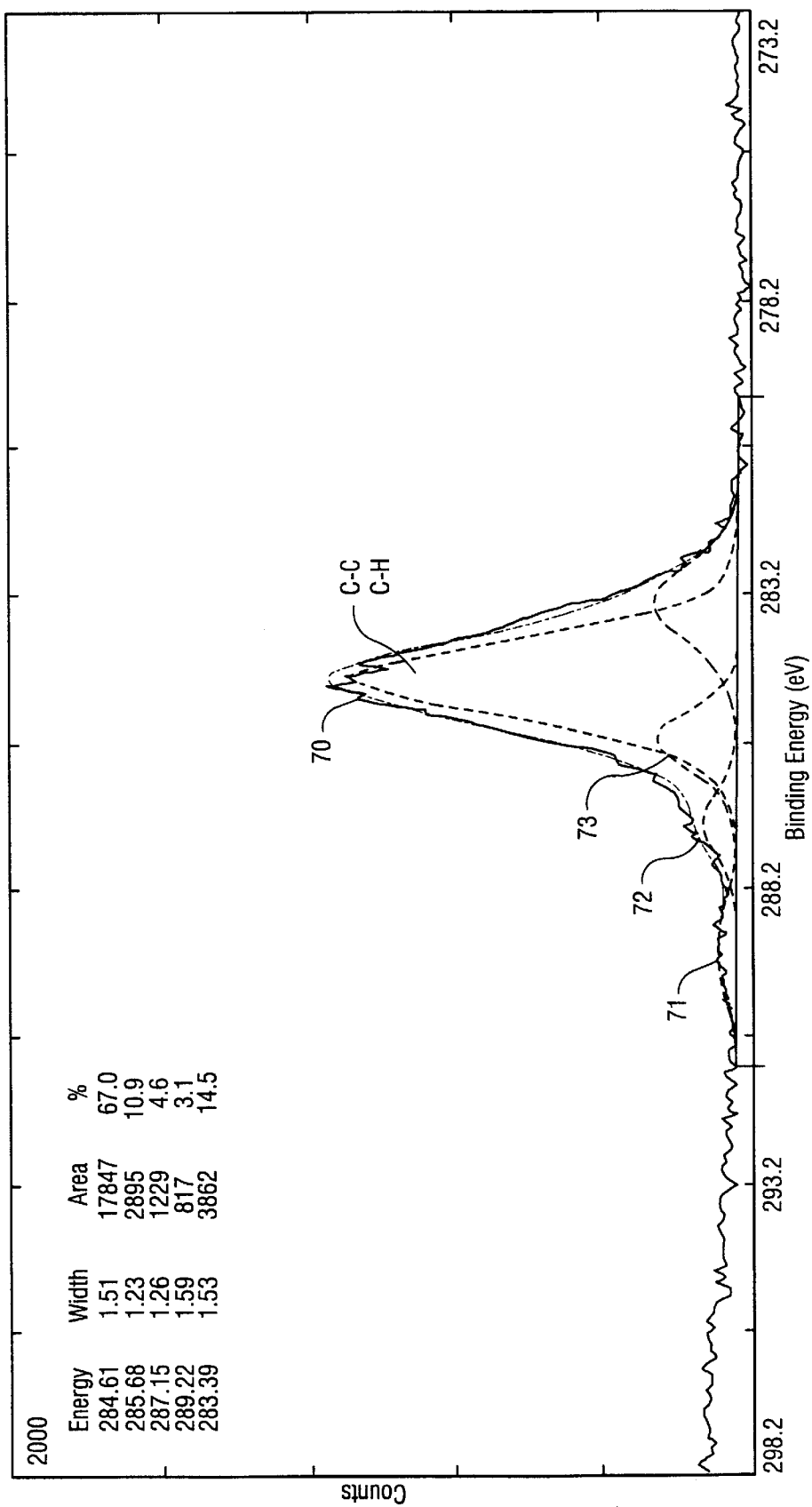
FIG. 15 is a binding energy (eV) versus counts graph of the coated article of FIG. 14 in another eV region, taken by XPS.
Figure 16:
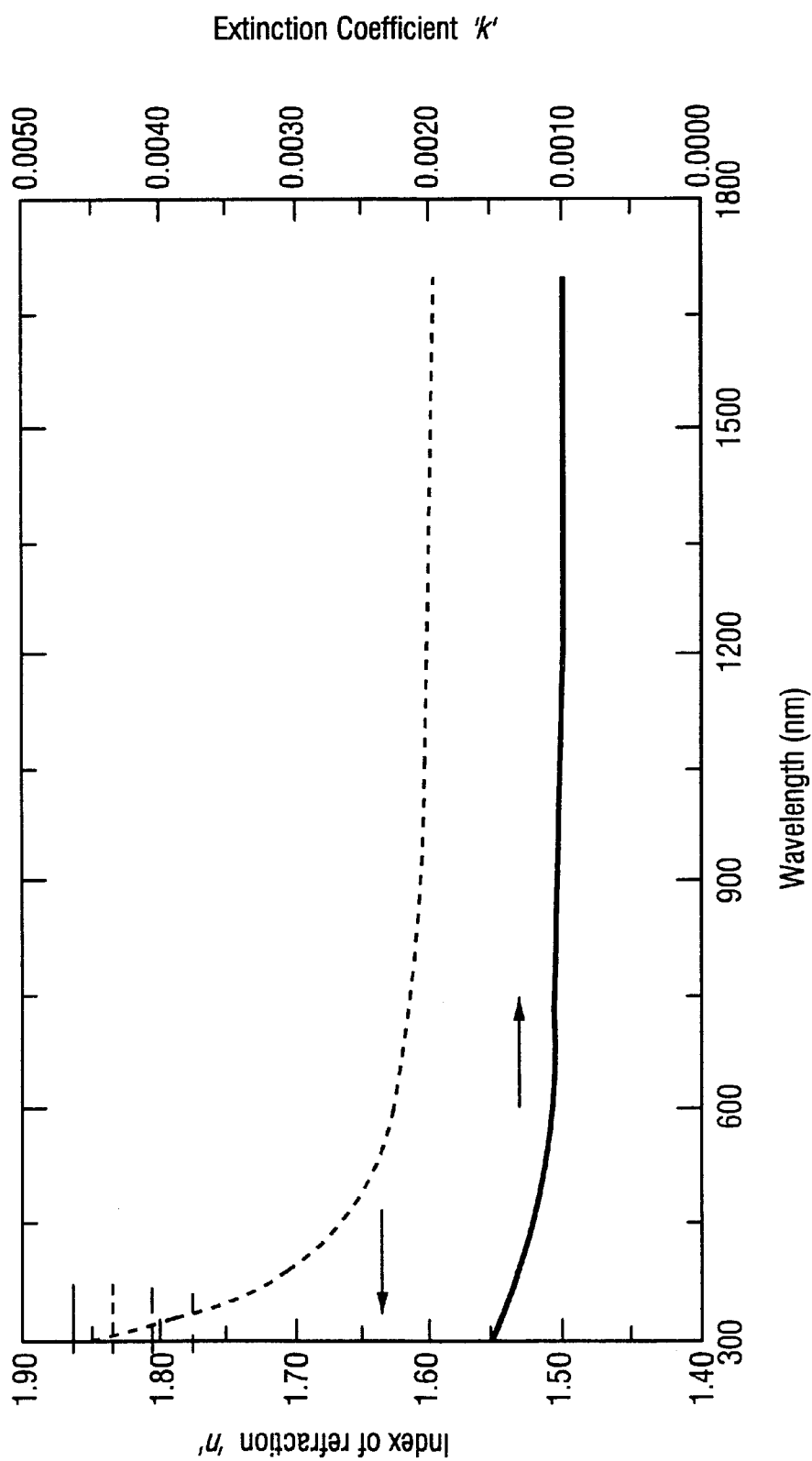
FIG. 16 is a wavelength (nm) versus index of refraction (n) and extinction coefficient (k) according to an embodiment of this invention.

FIGS. 14–15 illustrate actual XPS analysis of Sample No. 1. The large hump in the FIG. 14 graph at approximately the 530–535 eV binding energy indicates that most of the Si—O and C—O bonds proximate the surface of coating 3 are of the tetrahedral or $sp^3$ type (i.e. tetrahedral bonds of these elements are at that particular binding energy). The large hump 70 in the FIG. 15 graph at approximately the 282–288 eV binding energy indicates that the C—C and C—H bonds proximate the surface of coating 3 are of the tetrahedral or $sp^3$ type (i.e. tetrahedral bonds of these elements C and H are at that particular binding energy). Smaller hump 71 in FIG. 15 is illustrative of C—F and O—C=O bonds in coating 3. Hump 72 in FIG. 15 is illustrative of C=O bonds in coating 3. Hump 73 is illustrative of C—O bonds in coating 3. It is noted that large hump 70 indicates that coating 3 may include bonds where a C atom is bonded to at least three other C atoms as well as to a H atom via tetrahedral or $sp^3$ type bonding.

Certain aspects of carbon (C) are now described generally, to aid in the understanding of this invention.

Carbon has the ability to form structures based on directed covalent bonds in all three spatial dimensions. Two out of the six electrons of a carbon atom lie in the 1s core and hence do not participate in bonding, while the four remaining 2s and 2p electrons take part in chemical bonding to neighboring atoms. The carbon atom's one 2s and three 2p electron orbitals can hybridise in three different ways. This enables carbon to exist as several allotropes. In nature, three allotropic crystalline phases exist, namely diamond, graphite and the fullerenes and a plethora of non-crystalline forms.

For the diamond crystalline allotrope, in tetrahedral or $sp^3$ bonding all the four bonding electrons form σ bonds. The space lattice in diamond is shown in FIG. 4 where each carbon atom is tetrahedrally bonded to four other carbon atoms by σ bonds of length 0.154 nm and bond angle of 109° 53". The strength of such a bond coupled with the fact that diamond is a macromolecule (with entirely covalent bonds) give diamond unique physical properties: high atomic density, transparency, extreme hardness, exceptionally high thermal conductivity and extremely high electrical resistivity ($10^{16}$ Ω-cm).

The properties of graphite are governed by its trigonal bonding. The outer 2s, $2p_x$ and $2p_y$ orbitals hybridise in a manner to give three co-planar $sp^2$ orbitals which form σ bonds and a p-type π orbital $2p_z$ perpendicular to the $sp^2$ orbital plane, as shown in FIG. 5. Graphite consists of hexagonal layers separated from each other by a distance of 0.34 nm. Each carbon atom is bonded to three others by 0.142 nm long σ bonds within an hexagonal plane. These planes are held together by weak van der Waals bonding which explains why graphite is soft along the $sp^2$ plane.

As for amorphous carbon, there exists a class of carbon in the metastable state without any long range order. Material properties change when using different deposition techniques or even by varying the deposition parameters within a single technique. In this category of materials on one extreme we have ta—C (e.g. inclusive in coating 3 and layer 5) which is the most diamond-like with up to 90% C—C $sp^3$ bonding in certain preferred embodiments and on the other a-C (amorphous carbon), produced by thermal evaporation of carbon, in which more than 95% graphitic bonds are prevalent. In this respect, these two materials reflect the intrinsic diversity of non-crystalline forms of carbon.

Coated articles according to any of the aforesaid embodiments may be used, for example, in the context of automotive windshields, automotive back windows, automotive side windows, architectural glass, IG glass units, residential or commercial windows, and the like.

In certain embodiments of this invention, coating 3 has a contact angle of at least about 70°, more preferably at least about 80°, and even more preferably at least about 100° after a taber abrasion resistance test has been performed pursuant to ANSI Z26.1. The test utilizes 1,000 rubbing cycles of coating 3, with a load a specified in Z26.1 on the wheel(s). Another purpose of this abrasion resistance test is to determine whether the coated article is resistive to abrasion (e.g. whether hazing is less than 4% afterwards). ANSI Z26.1 is hereby incorporated into this application by reference.

Once given the above disclosure, many other features, modifications, and improvements will become apparent to the skilled artisan. Such other features, modifications, and improvements are, therefore, considered to be a part of this invention, the scope of which is to be determined by the following claims.

I claim:

1. A method of making a coated article, the method comprising:

providing a substrate;

depositing a diamond-like carbon (DLC) inclusive coating having more $sp^3$ carbon—carbon bonds than $sp^2$ carbon—carbon bonds on the substrate so that the DLC inclusive coating has an initial contact angle θ of at least about 100 degrees and the DLC has an average hardness of at least about 10 GPa.

2. The method of claim 1, further comprising plasma treating an outmost surface of the coating in order to provide at least H atoms in the coating proximate the outermost surface thereof, so as to reduce surface energy of the coating.

3. The method of claim 1, wherein said depositing step is carried out using at least plasma ion beam deposition.

4. The method of claim 3, wherein said depositing step includes using at least one of $H_2$ and acetylene feedstock gas.

5. The method of claim 3, wherein said depositing step includes varying ion energy within a range of from about 100 to 800 eV during said depositing so that the coating has different layer portions having different densities.

6. The method of claim 1, wherein the DLC has an average hardness of at least about 20 GPa.

7. A method of making a coated article, the method comprising:

providing a substrate;

depositing a layer comprising amorphous diamond-like (DLC) having more $sp_3$ carbon—carbon bonds than $sp_2$ carbon—carbon bonds on the substrate so that the layer comprising amorphous DLC has an initial contact angle θ of at least about 100 degrees and an average hardness of at least about 10 GPa.

8. The method of claim 7, wherein the layer comprising amorphous DLC has an average hardness of at least about 20 GPa.

\* \* \* \* \*